M. J. SVEHLA.
GAME TRAP.
APPLICATION FILED NOV. 22, 1920.

1,421,611.

Patented July 4, 1922.

Inventor:
Martin J. Svehla.
By Fred'k J. Harson
Attorney.

UNITED STATES PATENT OFFICE.

MARTIN J. SVEHLA, OF SUTHERLAND, IOWA.

GAME TRAP.

1,421,611.    Specification of Letters Patent.    Patented July 4, 1922.

Application filed November 22, 1920. Serial No. 425,705.

*To all whom it may concern:*

Be it known that I, MARTIN J. SVEHLA, a citizen of the United States, residing at Sutherland, in the county of O'Brien and State of Iowa, have invented certain new and useful Improvements in Game Traps, of which the following is a specification.

My invention relates to improvements in game traps and has for its particular object to provide a trap having spring actuated trap-jaws adapted to be set or opened by means of a plunger which plunger is adapted to be stepped upon by the leg of an animal for moving the same downward and causing the trap-jaws to be closed upon the leg of an animal by the action of resilient or spring means.

A further object of the invention is to provide a trap which will be simple and inexpensive in structure, and yet highly efficient for the purposes intended.

With the above and other objects in view, the invention consists in the novel features of construction, arrangement and combination of parts more fully described hereinafter and finally pointed out in the claims hereto appended.

Figure 1:
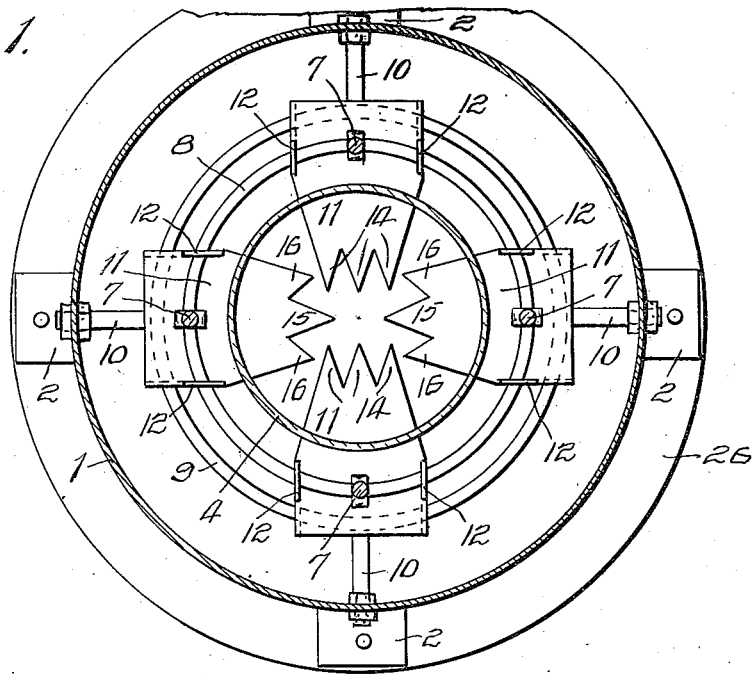

Referring to the accompanying drawings forming a part of this specification wherein like characters of reference denote similar parts throughout the several views:

Fig. 1. is a horizontal sectional view of the trap taken on a line just above the trap-jaws. which are shown as sprung or closed.

Figure 2:
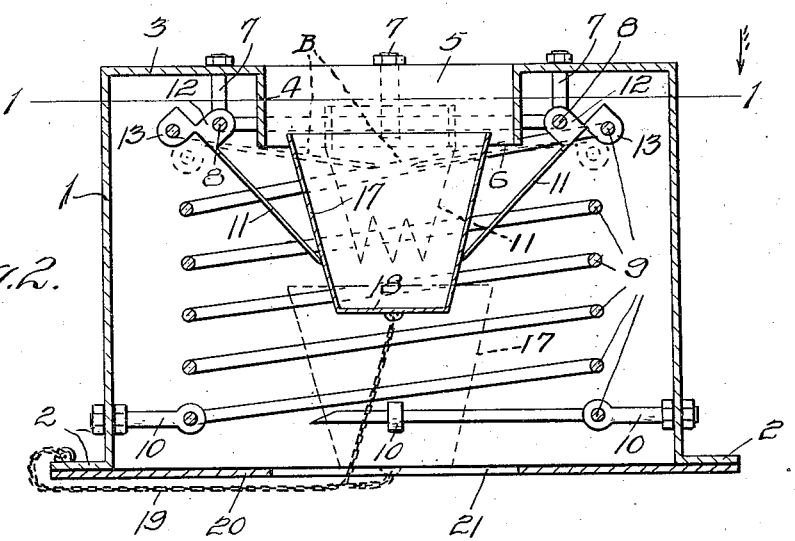

Fig. 2, is a vertical sectional view of the trap, the same being shown as set and ready to trap an animal.

In carrying out the aim of my present invention, I employ a suitable hollow case or housing 1 having the suitable supporting feet 2. The top 3 of the case is provided with a centrally arranged collar 4 having the opening 5 which depends downwardly from the top of the case into the case a suitable distance. The lower edge 6 of the collar acts as a stop for jaw-members and limits their upward movement as will be clearly understood hereinafter.

Suspended from the top 3. of the case 1. by suitable supports 7. is a stationary ring 8 of circular cross-section.

A suitable coiled spring 9 is carried within the case or housing 1. The lower coil of the spring passes through a plurality of suitable supports 10 fixed to the side wall of the case 1 to support and hold the coiled spring 9 in an upright position, as clearly shown in Figure 2.

Four suitable trap-jaws 11 are arranged in opposed pairs with the casing 1 adjacent the collar 4. Each jaw 11 is provided near the outer end with a pair of upwardly extending supporting ears 12 through which the wire-ring 8 is adapted to pass thereby pivotally supporting the trap-jaws from the ring 8. as clearly shown in the drawings. The trap-jaws 11 are each further provided with a pair of downwardly extending ears 13 which are arranged a suitable distance to the rear of the ears 12. The upper coil of the coiled spring 9 is adapted to pass through the ears 13, as clearly shown in Figure 2. Two of the opposed jaws 11 are provided with a plurality of pointed prongs 14. The other two opposed jaws 11 are provided with a long central prong 15 and two short side prongs 16. The two side prongs 16 are made shorter to prevent the teeth from interlocking with the side teeth 14 of the two adjacent jaws 11. When the jaws 11 are in their closed or sprung position, as clearly shown in Figure 1, the points of the several jaws extend practically to the center of the case. leaving but a slight opening for the leg of an animal. as is manifest.

The means for setting and tripping the trap consists of a suitable hollow cone shaped plunger 17 having its upper and larger end open and its lower and smaller end closed. as at 18. The plunger 17 is fastened or connected to one of the feet 2 of the case by means of a suitable chain or similar flexible connection 19.

A suitable base plate 20 is fixed to the feet 2. of the case 1. to prevent the trap from sinking into soft soil, such as sand and the like. The bottom of the plate 20 is provided with a central opening 21 sufficiently large to allow the plunger 17 to pass therethrough prior to resetting the trap.

The operation of the trap is as follows:

After the trap has been sprung and the jaws 11 are in their closed position as shown in full lines in Figure 1 and in dotted lines B in Figure 2, the trapper merely inserts the plunger 17 upwardly between the trap-jaws 11 after they have been spread apart to assume an extreme slanting position. In Fig. 2. I have shown the plunger 17 in its set position with the prongs of the jaws 11 in contact with the slanting wall of the plunger 17 which holds the plunger in its set position, as is manifest.

To spring the trap after it has been set, all that is necessary is to have an animal place his foot into the plunger 17 and the weight of the animal will force the plunger downward until the pronged ends of the trap-jaws slip past the top edge of the plunger when they will penetrate the animal's leg and hold him firmly until relieved by the trapper.

It will be observed that the ring 8 acts as a pivot for the jaws to turn on and that owing to the fact that the upper free coil of the spring 9 is carried by the ears 13 of the jaws, the upper coil especially is considerably expanded, as shown in full lines in Figure 2, so that when the jaws 11 are released by forcing the plunger 17 downwardly to the position shown in dotted lines in Figure 2, the contraction of the upper coil of the spring 9 will draw the outer ends of the jaws downwardly and move the inner pronged ends of the jaws 11 upwardly and inwardly, as clearly shown in dotted lines B in Figure 2.

The many advantages of the herein described invention will readily suggest themselves to those skilled in the art to which it appertains.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and the terms of the following claims, hence I wish it to be understood that I reserve the right to make any such changes or modifications as may fairly fall within the scope of the appended claims when fairly construed.

What I claim is:—

1. In a trap of the class described, comprising a hollow case having a central opening in the top thereof, hingedly supported jaw-members having pronged inner ends arranged in opposed pairs within the case, a plunger for setting and releasing the jaw-members, spring means acting upon the jaw-members for closing the jaw-members after being released from engagement with the plunger, and means to limit the upward movement of the pronged ends of said jaw-members.

2. In a trap of the class described, comprising a hollow case having a central opening in the top thereof, a plurality of pronged jaw-members arranged in opposed pairs, means for hingedly supporting said jaw-members, a coiled spring supported by its lower coil, means for connecting the upper coil of the spring with the outer end of each jaw-member, and a tapered plunger for spreading the jaw-members and expanding the upper coil of the spring so that when an animal steps upon the plunger and moves the same downwardly and out of engagement with the pronged ends of the jaw-members the contraction of the upper coil of the spring will force the pronged ends of the jaw-members into the leg of the trapped animal and firmly hold the animal until removed by a trapper.

3. In a trap of the class described, a hollow case, a collar depending from the case providing a central opening for the passage of an animal's foot and leg, a plurality of jaw-members arranged in opposed pairs having their inner ends provided with prongs, means for hingedly suspending said jaw-members adjacent said collar, a coiled spring, means for receiving the lower coil of said spring for supporting same, and means carried by the outer end of each jaw for receiving the upper coil of said spring, a plunger adapted to be forced between the pronged ends of said jaws when they are being set to outwardly and upwardly expand the upper coil of the spring when the jaws are set so that when the plunger is forced past the pronged ends of the jaws that the contraction of the upper coil of the spring will move the pronged ends of the jaws upwardly and inwardly until the jaws engage the lower edge of the aforesaid collar.

In testimony whereof, I have hereunto signed my name to the specification.

MARTIN J. SVEHLA.